(12) United States Patent
Okamura et al.

(10) Patent No.: US 12,422,811 B2
(45) Date of Patent: Sep. 23, 2025

(54) CONTROL SYSTEM, RELAY DEVICE, AND ACCESS MANAGEMENT PROGRAM

(71) Applicant: OMRON Corporation, Kyoto (JP)

(72) Inventors: Kotaro Okamura, Kyoto (JP); Naoki Hirobe, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 379 days.

(21) Appl. No.: 17/795,401

(22) PCT Filed: Dec. 17, 2020

(86) PCT No.: PCT/JP2020/047253
§ 371 (c)(1),
(2) Date: Jul. 26, 2022

(87) PCT Pub. No.: WO2021/161653
PCT Pub. Date: Aug. 19, 2021

(65) Prior Publication Data
US 2023/0093865 A1    Mar. 30, 2023

(30) Foreign Application Priority Data
Feb. 10, 2020 (JP) ................................. 2020-020425

(51) Int. Cl.
*G05B 19/05*      (2006.01)
*G06F 21/62*      (2013.01)

(52) U.S. Cl.
CPC ............ *G05B 19/058* (2013.01); *G06F 21/62* (2013.01); *G05B 2219/1108* (2013.01); *G05B 2219/14006* (2013.01)

(58) Field of Classification Search
CPC .......... G05B 19/058; G05B 2219/1108; G05B 2219/14006; G05B 19/042; G05B 19/05; G06F 21/62; G06F 21/606
See application file for complete search history.

(56) References Cited

U.S. PATENT DOCUMENTS 11,178,150 B1 * 11/2021 Lie ..................... H04L 63/101
2010/0269156 A1 * 10/2010 Hohlfeld .............. H04L 9/321
                                                                            726/4

(Continued)

FOREIGN PATENT DOCUMENTS

CN         103543684 A         1/2014
CN         105610785 A         5/2016

(Continued)

OTHER PUBLICATIONS

Written Opinion of PCT/JP2020/047253 dated Mar. 2, 2021 [PCT/ISA/237].

(Continued)

*Primary Examiner* — Kamini S Shah
*Assistant Examiner* — Mohammed Shafayet
(74) *Attorney, Agent, or Firm* — Sughrue Mion, PLLC

(57) ABSTRACT

A control system includes a control unit configured to control a control object and communicate with an external device, and a relay unit configured to relay access from the external device to the control unit. The relay unit includes a reception unit configured to receive an authentication request from a request source, an authentication unit configured to authenticate validity of the request source upon receipt of the authentication request by the reception unit, and an access management unit configured to control a restriction level of access from the external device to the control unit when the validity of the request source is authenticated by the authentication unit.

11 Claims, 12 Drawing Sheets

(56) References Cited

U.S. PATENT DOCUMENTS

| | | | |
|---|---|---|---|
| 2013/0123948 A1 | 5/2013 | Reid et al. | |
| 2015/0046701 A1* | 2/2015 | Rooyakkers | H04L 9/3263 |
| | | | 713/155 |
| 2015/0215338 A1* | 7/2015 | Haridas | H04L 63/0823 |
| | | | 726/1 |
| 2016/0142515 A1 | 5/2016 | Kawanojou et al. | |
| 2016/0219054 A1* | 7/2016 | Nagata | G06F 21/445 |
| 2016/0359825 A1 | 12/2016 | Chand et al. | |
| 2020/0364332 A1* | 11/2020 | Kitamura | G05B 19/048 |
| 2021/0075801 A1 | 3/2021 | Kitamura et al. | |

FOREIGN PATENT DOCUMENTS

| | | |
|---|---|---|
| CN | 105824283 A | 8/2016 |
| CN | 106227160 A | 12/2016 |
| JP | 11-184817 A | 7/1999 |
| JP | 2001-175615 A | 6/2001 |
| JP | 2016-134137 A | 7/2016 |
| JP | 6116785 B1 | 4/2017 |
| JP | 2017-156789 A | 9/2017 |
| JP | 2019-96149 A | 6/2019 |
| JP | 2019-096150 A | 6/2019 |

OTHER PUBLICATIONS

International Search Report of PCT/JP2020/047253 dated Mar. 2, 2021 [PCT/ISA/210].
Japanese Office Action issued Dec. 19, 2023 in Application No. 2020-020425.
Chinese Office Action issued Oct. 15, 2024 in Chinese Application No. 202080093508.4.

\* cited by examiner

FIG.3

VARIATIONS OF CONFIGURATION OF CONTROL SYSTEM

| | | CONTROL UNIT | RELAY UNIT | REQUEST SOURCE | RECEPTION UNIT | AUTHENTICATION UNIT | ACCESS MANAGEMENT UNIT |
|---|---|---|---|---|---|---|---|
| PATTERN 1 | CONTROL DEVICE | O | - | - | - | - | - |
| | RELAY DEVICE | - | O | - | O | O | O |
| | SUPPORT DEVICE | - | - | O | - | - | - |
| PATTERN 2 | CONTROL DEVICE | O | - | O | - | - | - |
| | RELAY DEVICE | - | O | - | O | O | O |
| | SUPPORT DEVICE | - | - | - | - | - | - |
| PATTERN 3 | CONTROL DEVICE | O | - | - | - | - | - |
| | RELAY DEVICE | - | O | O | O | O | O |
| | SUPPORT DEVICE | - | - | - | - | - | - |
| PATTERN 4 | CONTROL DEVICE (INTEGRATED WITH RELAY DEVICE) | O | O | O | O | O | O |
| | SUPPORT DEVICE | - | - | - | - | - | - |
| | CONTROL DEVICE (INTEGRATED WITH RELAY DEVICE) | O | O | - | O | O | O |
| | SUPPORT DEVICE | - | - | O | - | - | - |

FIG.6
PORT MANAGEMENT LIST (IN ACCESS MANAGEMENT LIST)

| TYPE OF MANAGEMENT MODE (X) | | COMMUNICATION PERMITTED STATE OF PORT ($\alpha$) | | |
|---|---|---|---|---|
| X | PHASE | $\alpha = 1$ | $\alpha = 2$ | $\alpha = 3$ |
| 1 | DEVELOPMENT | OK | OK | OK |
| 2 | OPERATION | OK | NG | NG |
| 3 | MAINTENANCE | OK | OK | NG |

FIG.7

IP ADDRESS MANAGEMENT LIST
(IN ACCESS MANAGEMENT LIST)

| BLACKLIST |
|---|
| 192.1.2.255 |
| 192.168.0.0 |
| ... |

CONTROL SYSTEM, RELAY DEVICE, AND ACCESS MANAGEMENT PROGRAM

CROSS REFERENCE TO RELATED APPLICATIONS

This application is a National Stage of International Application No. PCT/JP2020/047253 filed on Dec. 17, 2020, based on and claiming priority to Japanese Patent Application No. 2020-020425 filed on Feb. 10, 2020, the contents of each of which being herein incorporated by reference in their entireties.

TECHNICAL FIELD

The present invention relates to a control system, a relay device, and an access management program, and more specifically, to a control system that controls a control object, a relay device that relays access from an external device to a control device that controls the control object, and an access management program for managing access from the external device to the control device that controls the control object.

BACKGROUND ART

Machines and equipment used in a production site using factory automation (FA) are typically controlled by a control device such as a programmable controller (programmable logic controller; hereinafter, also referred to as a "PLC"). Such a control device is configured to be able to communicate with an external device.

For example, Japanese Patent Laying-Open No. 2001-175615 (PTL 1) discloses a production system including a device agent associated with a machine tool and an agent management server that manages the device agent.

CITATION LIST

Patent Literature

PTL 1: Japanese Patent Laying-Open No. 2001-175615

SUMMARY OF INVENTION

Technical Problem

As in the production system disclosed in PTL 1, in the field of FA, a system configured to allow access from an external device to a control device over a network is available, but a secure state is not necessarily ensured for communications between the control device and the external device. In this regard, in the field of information technology (IT), a technology for improving security such as virtual private network (VPN) is available. In the field of FA, however, such an external device runs on a so-called legacy application in many cases, and it is not realistic to implement a new security technology into such an old-fashioned system because the system may need to be significantly changed, which requires a significant increase in cost or a temporary halt on the operation of the production site.

It is therefore an object of the present invention to solve the above-described problems and to provide a technique for improving security without changing a legacy application.

Solution to Problem

Provided according to an example of the present disclosure is a control system configured to control a control object. The control system includes a control unit configured to control the control object and communicate with an external device, and a relay unit configured to relay access from the external device to the control unit. The relay unit includes a reception unit configured to receive an authentication request from a request source, an authentication unit configured to authenticate validity of the request source upon receipt of the authentication request by the reception unit, and an access management unit configured to control a restriction level of access from the external device to the control unit when the validity of the request source is authenticated by the authentication unit.

According to this disclosure, since the restriction level of access from the external device to the control unit is controlled by the relay unit that relays access from the external device to the control unit when the validity of the request source is authenticated by the relay unit, it is possible to improve security without changing the external device that runs on a legacy application.

In the above disclosure, the authentication unit authenticates the validity of the request source based on predetermined authentication data.

According to this disclosure, it is possible to further improve security of the authentication of the validity of the request source performed by the relay unit using the predetermined authentication data.

In the above disclosure, the authentication unit authenticates the validity of the request source with communications from the request source concealed.

According to this disclosure, it is possible to further improve security of the authentication of the validity of the request source performed by the relay unit by virtue of the concealed communications.

In the above disclosure, the control unit communicates with the external device in accordance with a type of a management mode, and the access management unit controls the restriction level of access from the external device in accordance with the type of the management mode.

According to this disclosure, since the relay unit controls the restriction level of access from the external device to the control unit in accordance with the type of the management mode, it is possible to improve security while taking the operation aspect into consideration.

In the above disclosure, the relay unit keeps a log of access from the external device to the control unit.

According to this disclosure, since it is possible to keep the log of access from the external device to the control unit, access from the external device to the control unit is easily managed.

In the above disclosure, the access management unit controls, based on a list for controlling the restriction level of access from the external device to the control unit, the restriction level of access from the external device to the control unit when the validity of the request source is authenticated by the authentication unit.

According to this disclosure, it is possible to improve security with the list for controlling the restriction level of access from the external device to the control unit.

In the above disclosure, the list is updated when an incident occurs in access from the external device to the control unit.

According to this disclosure, it is possible to improve security with the list with consideration given to the occurrence of the incident.

Provided according to another example of the present disclosure is a relay device configured to relay access from an external device to a control device configured to control a control object. The relay device includes a reception unit configured to receive an authentication request from a request source, an authentication unit configured to authenticate validity of the request source upon receipt of the authentication request by the reception unit, and an access management unit configured to control a restriction level of access from the external device to the control device when the validity of the request source is authenticated by the authentication unit.

According to this disclosure, since the restriction level of access from the external device to the control device is controlled by the relay device that relays access from the external device to the control device when the validity of the request source is authenticated by the relay device, it is possible to improve security without changing the external device that runs on a legacy application.

Provided according to another example of the present disclosure is an access management program configured to manage access from an external device to a control device configured to control a control object. The access management program causes a computer to execute a reception step of receiving an authentication request from a request source, an authentication step of authenticating validity of the request source upon receipt of the authentication request in the reception step, and an access management step of controlling a restriction level of access from the external device to the control device when the validity of the request source is authenticated in the authentication step.

According to this disclosure, since the restriction level of access from the external device to the control device is controlled by the access management program for managing access from the external device to the control device when the validity of the request source is authenticated by the access management program, it is possible to improve security without changing the external device that runs on a legacy application.

BRIEF DESCRIPTION OF DRAWINGS

FIG. 3 is a table showing variations of the configuration of the control system according to the present embodiment.

FIG. 6 is a table showing a port management list included in an access management list according to the present embodiment.

FIG. 7 is a table showing an IP address management list included in the access management list according to the present embodiment.

DESCRIPTION OF EMBODIMENTS

Figure 1:
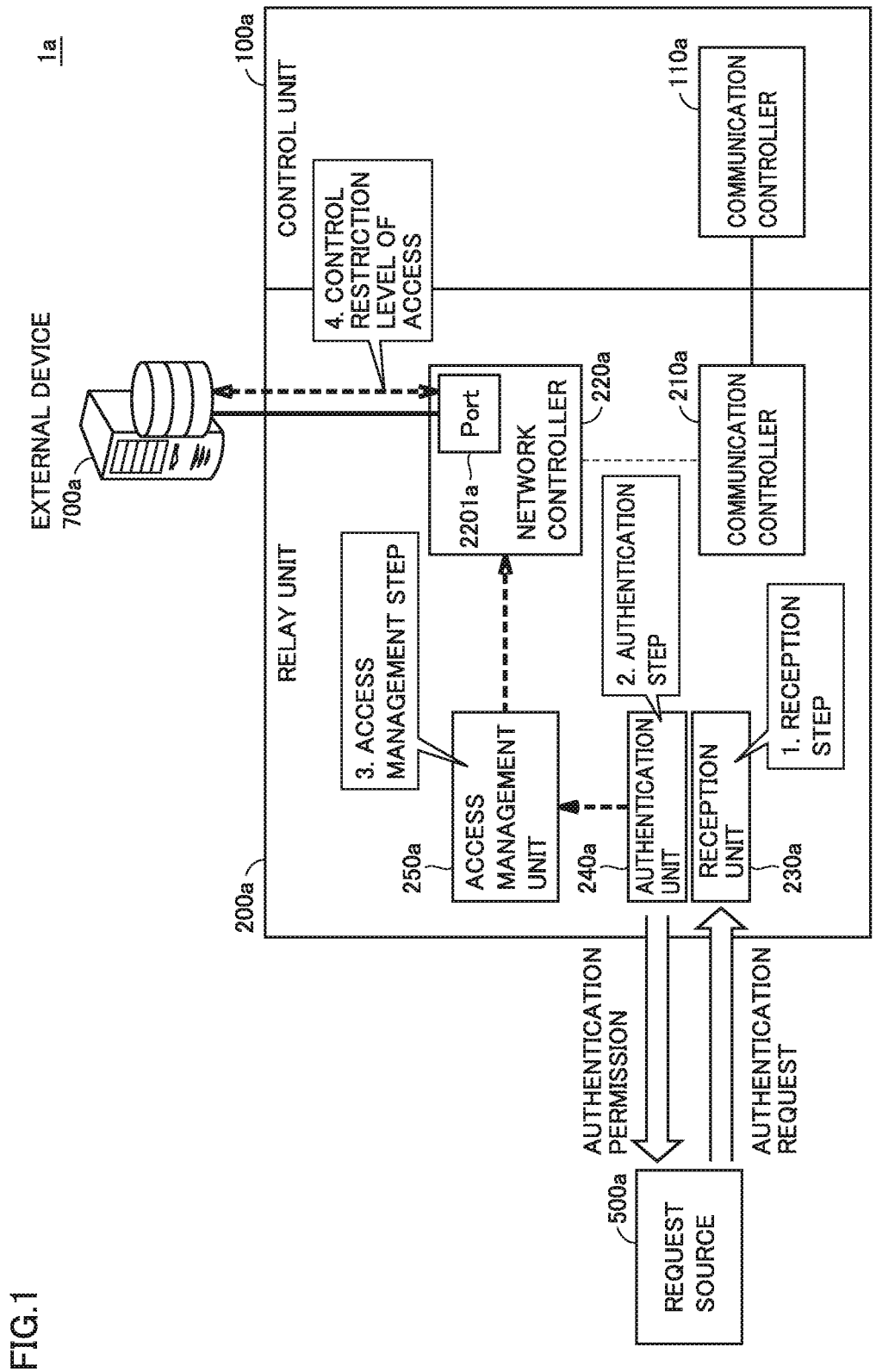
FIG. 1 is a schematic diagram for describing a control system according to the present embodiment.

Embodiments of the present invention will be described in detail with reference to the drawings. Note that the same or corresponding parts in the drawings are denoted by the same reference numerals, and no redundant description will be given of such parts.

A. Application Example

First, an example of a case to which the present invention is applied will be described.

FIG. 1 is a schematic diagram for describing a control system 1a according to the present embodiment. As illustrated in FIG. 1, control system 1a includes a control unit 100a, an external device 700a, and a relay unit 200a.

Control unit 100a is configured to control a control object and communicate with external device 700a via relay unit 200a. Control unit 100a corresponds to the function of an industrial controller that controls control objects such as various types of equipment or apparatus, and typically corresponds to a function included in a programmable logic controller (PLC). Control unit 100a controls the control object (not illustrated) in accordance with a user program designed in advance. Examples of the control object include various industrial equipment for automating a production process used in the field of FA. Specifically, the examples of the control object include a robot controller, an arm robot controlled by a robot controller, a servomotor controlled by a servo driver, a visual sensor configured to take an image of a workpiece, and other equipment used in a production process.

External device 700a is configured to be able to communicate with control unit 100a via relay unit 200a. External device 700a collects, from control unit 100a, and accumulates various data. The various data accumulated by external device 700a contains data on the control of the control object performed by control unit 100a. For example, the various data accumulated by external device 700a contains information on traceability measured from the workpiece.

Relay unit 200a relays access from external device 700a to control unit 100a. Specifically, relay unit 200a includes a communication controller 210a and a network controller 220a including a port 2201a. Communication controller 210a is responsible for exchanging data with a communication controller 110a included in control unit 100a. Data acquired from control unit 100a via communication controller 210a is transmitted to external device 700a via port 2201a of network controller 220a.

Note that control unit 100a and relay unit 200a may be included in different devices, or may be included in the same device. For example, a PLC, which is an example of the device including control unit 100a, may have the function of control unit 100a but not the function of relay unit 200a, or may have the function of control unit 100a and the function of relay unit 200a.

In control system 1a having such a configuration, external device 700a accesses control unit 100a via relay unit 200a to collect, from control unit 100a, and accumulates various data. Herein, in the field of FA to which control system 1*a* belongs, external device 700*a* runs on a so-called legacy application in many cases. For this reason, in a case where a relatively new security technology such as VPN is implemented in order to ensure communications between external device 700*a* and control unit 100*a* used in the related art are maintained in a secure state, the system may need to be significantly changed in its entirety, which requires a significant increase in cost or a temporary halt on the operation of the production site.

Therefore, according to the present embodiment, a technique for improving security without changing a legacy application has been proposed.

Specifically, relay unit 200*a* includes a reception unit 230*a*, an authentication unit 240*a*, and an access management unit 250*a*. Reception unit 230*a* receives an authentication request from a request source 500*a*. Authentication unit 240*a* authenticates the validity of request source 500*a* upon receipt of the authentication request by reception unit 230*a*. Access management unit 250*a* controls a restriction level of access from external device 700*a* to control unit 100*a* when authentication unit 240*a* authenticates the validity of request source 500*a*.

Request source 500*a* is a function unit that starts (kicks off) a series of processes of requesting access from external device 700*a* to control unit 100*a*. Request source 500*a* may be included in a device different from a device including control unit 100*a*, or may be included in the same device as a device including control unit 100*a*. For example, a PLC, which is an example of the device including control unit 100*a*, may have the function of control unit 100*a* but not the function of request source 500*a*, or may have the function of control unit 100*a* and the function of request source 500*a*.

The "validity of the request source" includes, for example, a property that request source 500*a* may be permitted to control the restriction level of access from external device 700*a* to control unit 100*a*. In other words, when the validity of request source 500*a* is authenticated, request source 500*a* is permitted to control the restriction level of access from external device 700*a* to control unit 100*a*.

Authentication unit 240*a* authenticates the validity of request source 500*a* based on predetermined authentication data. For example, as a method of authenticating the validity of request source 500*a* by authentication unit 240*a*, any authentication may be applied as long as the authentication can ensure security, such as password authentication using an ID and a password of a user, biometric authentication using physical features such as a fingerprint or a face image of the user, certificate authentication using an electronic certificate issued by a certificate authority, or key authentication using key data such as a private key/public key or a common key. That is, the "predetermined authentication data" contains an ID and a password used in password authentication, physical features of the user used in biometric authentication, an electronic certificate used in certificate authentication, key data used in key authentication, or the like. Further, authentication unit 240*a* authenticates the validity of request source 500*a* with communications from request source 500*a* concealed. As a representative concealment method, a technique for improving security such as VPN may be applied.

The "restriction level of access" is a degree indicating that access from external device 700*a* to control unit 100*a* is in a prohibited state or a permitted state. For example, when access from external device 700*a* to control unit 100*a* is controlled from the prohibited state to the permitted state, the restriction level of access goes up, and when access from external device 700*a* to control unit 100*a* is controlled from the permitted state to the prohibited state, the restriction level of access goes down.

Further, the restriction of access from external device 700*a* to control unit 100*a* is imposed on not only one port 2201*a* but also each of a plurality of ports. For example, for access from external device 700*a* to control unit 100*a*, when access to a first port is controlled from the prohibited state to the permitted state, and access to a second port is controlled from the prohibited state to the permitted state, the restriction level of access goes down. When access to the first port is controlled from the prohibited state to the permitted state, and access to the second port is maintained in the permitted state or the prohibited state, the restriction level of access goes down. When access to the first port is maintained in the permitted state or the prohibited state, and access to the second port is controlled from the prohibited state to the permitted state, the restriction level of access goes down. On the other hand, for access from external device 700*a* to control unit 100*a*, when access to the first port is controlled from the permitted state to the prohibited state, and access to the second port is controlled from the permitted state to the prohibited state, the restriction level of access goes up. When access to the first port is controlled from the permitted state to the prohibited state, and the access to the second port is maintained in the permitted state or the prohibited state, the restriction level of access goes up. When access to the first port is maintained in the permitted state or the prohibited state, and access to the second port is controlled from the permitted state to the prohibited state, the restriction level of access goes up.

That is, when access from external device 700*a* to control unit 100*a* is controlled to be further restricted, the restriction level of access goes up, and when access from external device 700*a* to control unit 100*a* is controlled to be less restricted, the restriction level of access goes down.

Relay unit 200*a* configured as described above operates as follows. Specifically, relay unit 200*a* causes reception unit 230*a* to receive the authentication request from request source 500*a*. Such a process is referred to as a reception step. Next, relay unit 200*a* causes authentication unit 240*a* to authenticate the validity of request source 500*a*. Such a process is referred to as an authentication step. Relay unit 200*a* causes access management unit 250*a* to control the restriction level of access from external device 700*a* to control unit 100*a* when the validity of request source 500*a* is authenticated. Such a process is referred to as an access management step. Note that the series of processes of controlling, by relay unit 200*a*, the restriction level of access from external device 700*a* to control unit 100*a* is hereinafter also referred to as an access management process.

In control system 1*a*, since the restriction level of access from external device 700*a* to control unit 100*a* is controlled by relay unit 200*a* that relays access from external device 700*a* to control unit 100*a* when the validity of request source 500*a* is authenticated by relay unit 200*a*, it is possible to improve security without changing external device 700*a* that runs on a legacy application.

Note that the number of external devices 700*a* is not limited to one, and a plurality of external devices 700*a* may be provided. That is, the plurality of external devices 700*a* may each access control unit 100*a*. The restriction level of access may be controlled for each of the plurality of external devices 700*a*.

Control unit 100*a*, relay unit 200*a*, request source 500*a*, reception unit 230*a*, authentication unit 240*a*, and access management unit 250*a* described above may be implemented by a computer or a circuit board. An example of a case where such function units are implemented in a device will be described.

B. Hardware Configuration of Control System

Figure 2:
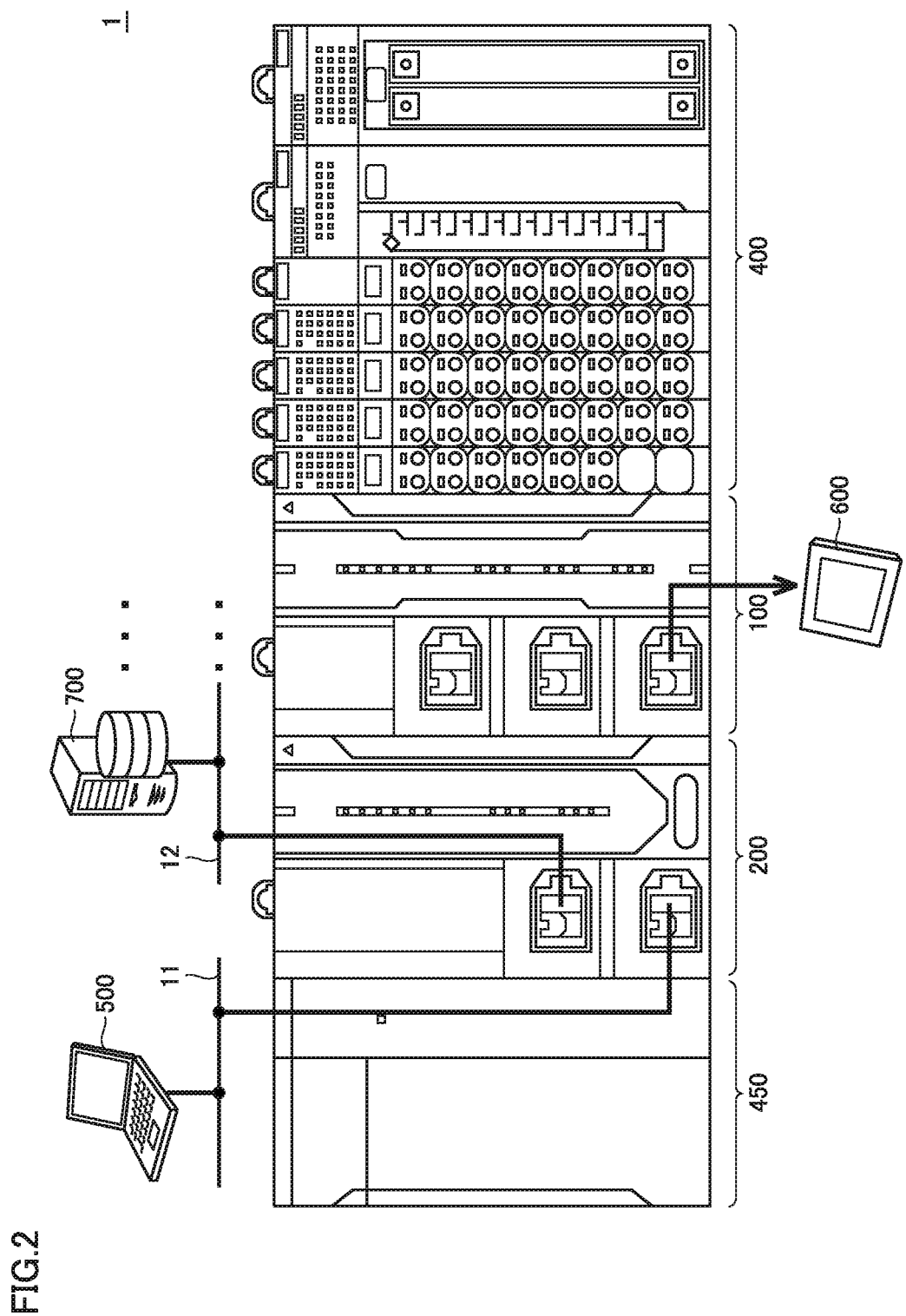
FIG. 2 is a diagram schematically illustrating an example of a hardware configuration of the control system according to the present embodiment.

FIG. 2 is a diagram schematically illustrating an example of a hardware configuration of a control system 1 according to the present embodiment. As illustrated in FIG. 2, control system 1 includes a control device 100, a relay device 200, at least one function unit 400, and a power supply unit 450.

Control device 100 and relay device 200 are connected over any desired data communication channel (for example, PCI Express (registered trademark), Ethernet (registered trademark), or the like). Control device 100 and at least one function unit 400 are connected over an internal bus.

Control device 100 performs a main process in control system 1. Control device 100 performs control calculation for controlling the control object in accordance with a required specification designed as desired. In the configuration example illustrated in FIG. 2, control device 100 includes at least one communication port, and one of the communication ports is communicatively connected to at least one human machine interface (HMI) 600.

Relay device 200 is connected to control device 100 and is responsible for communicating with other devices. In the configuration example illustrated in FIG. 2, relay device 200 includes at least one communication port, and one of the communication ports is communicatively connected to a support device 500 over a network 11, and another one of the communication ports is communicatively connected to at least one external device 700 over a network 12.

Function unit 400 provides various functions for allowing control system 1 to perform control on various control objects. Function unit 400 typically includes an I/O unit, a safety I/O unit, a communication unit, a motion controller unit, a temperature control unit, a pulse counter unit, and the like. Examples of the I/O unit include a digital input (DI) unit, a digital output (DO) unit, an analog input (AI) unit, an analog output (AO) unit, a pulse catch input unit, and a composite unit that is a combination of a plurality of types of units.

Power supply unit 450 supplies power of a predetermined voltage to each unit constituting control system 1.

C. Variations of Configuration of Control System

FIG. 3 is a table showing variations of the configuration of the control system according to the present embodiment. The function units including control unit 100a, relay unit 200a, request source 500a, reception unit 230a, authentication unit 240a, and access management unit 250a in the application example described with reference to FIG. 1 may each belong to any one of control device 100, relay device 200, and support device 500 in control system 1 illustrated in FIG. 2.

As illustrated in FIG. 3, in a control system according to a pattern 1, control device 100 has the function of control unit 100a, relay device 200 has the function of relay unit 200a, the function of reception unit 230a, the function of authentication unit 240a, and the function of access management unit 250a, and support device 500 has the function of request source 500a.

In a control system according to a pattern 2, control device 100 has the function of control unit 100a and the function of request source 500a, and relay device 200 has the function of relay unit 200a, the function of reception unit 230a, the function of authentication unit 240a, and the function of access management unit 250a.

In a control system according to a pattern 3, control device 100 and relay device 200 are integrated into a single device in the control system according to pattern 1. That is, in the control system according to pattern 3, the device in which control device 100 and relay device 200 are integrated has the function of control unit 100a, the function of relay unit 200a, the function of reception unit 230a, the function of authentication unit 240a, and the function of access management unit 250a, and support device 500 has the function of request source 500a.

In a control system according to a pattern 4, the device in which control device 100 and relay device 200 are integrated has the function of control unit 100a, the function of relay unit 200a, the function of request source 500a, the function of reception unit 230a, the function of authentication unit 240a, and the function of access management unit 250a.

Note that, in the present embodiment, the function of the control system according to pattern 1 will be described using an example illustrated in FIGS. 9 to 11, and the function of the control system according to pattern 2 will be described using an example illustrated in FIG. 12.

D. Example of Hardware Configuration of Control Device

Figure 4:
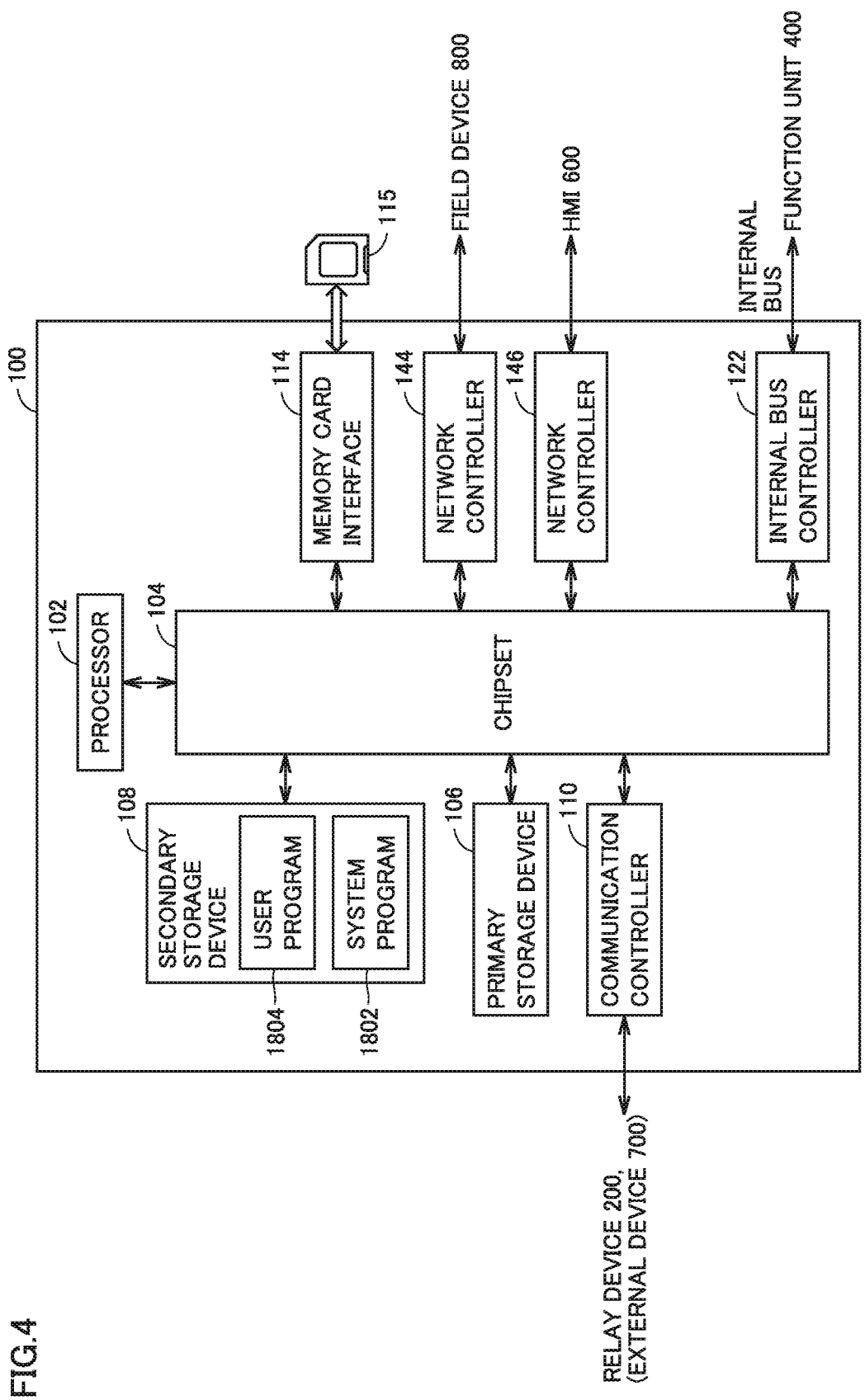
FIG. 4 is a diagram schematically illustrating an example of a hardware configuration of a control device according to the present embodiment.

FIG. 4 is a diagram schematically illustrating an example of a hardware configuration of the control device according to the present embodiment. As illustrated in FIG. 4, control device 100 includes, as main components, a processor 102 such as a central processing unit (CPU) or a graphical processing unit (GPU), a chipset 104, a primary storage device 106, a secondary storage device 108, a communication controller 110, a memory card interface 114, network controllers 144, 146, and an internal bus controller 122.

Processor 102 reads various programs stored in secondary storage device 108, loads the programs into primary storage device 106, and executes the programs to enable various functions.

Chipset 104 serves as an interface for exchanging data between processor 102 and each component to enable the entire function of control device 100.

Primary storage device 106 includes a volatile storage device such as a dynamic random access memory (DRAM) or a static random access memory (SRAM).

Secondary storage device 108 includes, for example, a non-volatile storage device such as a hard disk drive (HDD) and a solid state drive (SSD). Secondary storage device 108 stores not only a system program 1802 that provides basic functions but also a user program 1804 created as desired by the user. User program 1804 runs on a runtime environment provided by system program 1802.

Communication controller 110 is responsible for exchanging data with relay device 200. As communication controller 110, for example, a communication chip compatible with PCI Express (registered trademark), Ethernet (registered trademark), or the like may be used.

Memory card interface 114 is configured to receive a memory card 115 in a detachable manner and is capable of writing data such as a user program or various settings to memory card 115 or reading data such as a user program or various settings from memory card 115.

Each of network controllers 144, 146 is responsible for exchanging data with any device over the network. Network controllers 144, 146 may use an industrial network protocol such as EtherCAT (registered trademark), EtherNet/IP (registered trademark), DeviceNet (registered trademark), or CompoNet (registered trademark).

Network controller 144 is responsible for exchanging data with at least one field device 800. Field device 800 includes a sensor and a detector that collect, from the control object, various types of information necessary for control calculation, an actuator that imparts some action to the control object, or the like. Field device 800 includes a robot that gives some external action to the workpiece, a conveyor that conveys the workpiece, an I/O unit that exchanges signals with the sensor and the actuator arranged in the field, and the like.

Network controller 146 is responsible for exchanging data with HMI 600. HMI 600 presents various types of information obtained by control calculation in control system 1 to the user (operator), and generates an internal command or the like directed to control system 1 in response to an operation made by the user.

Internal bus controller 122 is responsible for exchanging data with at least one function unit 400. On the internal bus, a communication protocol unique to a manufacturer may be used, or a communication protocol that is the same as or compliant with any of the industrial network protocols may be used.

FIG. 4 illustrates the configuration example where processor 102 executes a program to provide necessary functions, but some or all of the functions thus provided may be implemented by a dedicated hardware circuit (for example, an application specific integrated circuit (ASIC), a field-programmable gate array (FPGA), or the like). Alternatively, a core part of control device 100 may be implemented by hardware having a general-purpose architecture (for example, an industrial personal computer based on a general-purpose personal computer). Further, a plurality of operating systems (OSs) having different uses may be executed in parallel using a virtualization technology, and a necessary application may be executed on each OS.

E. Example of Hardware Configuration of Relay Device

Figure 5:
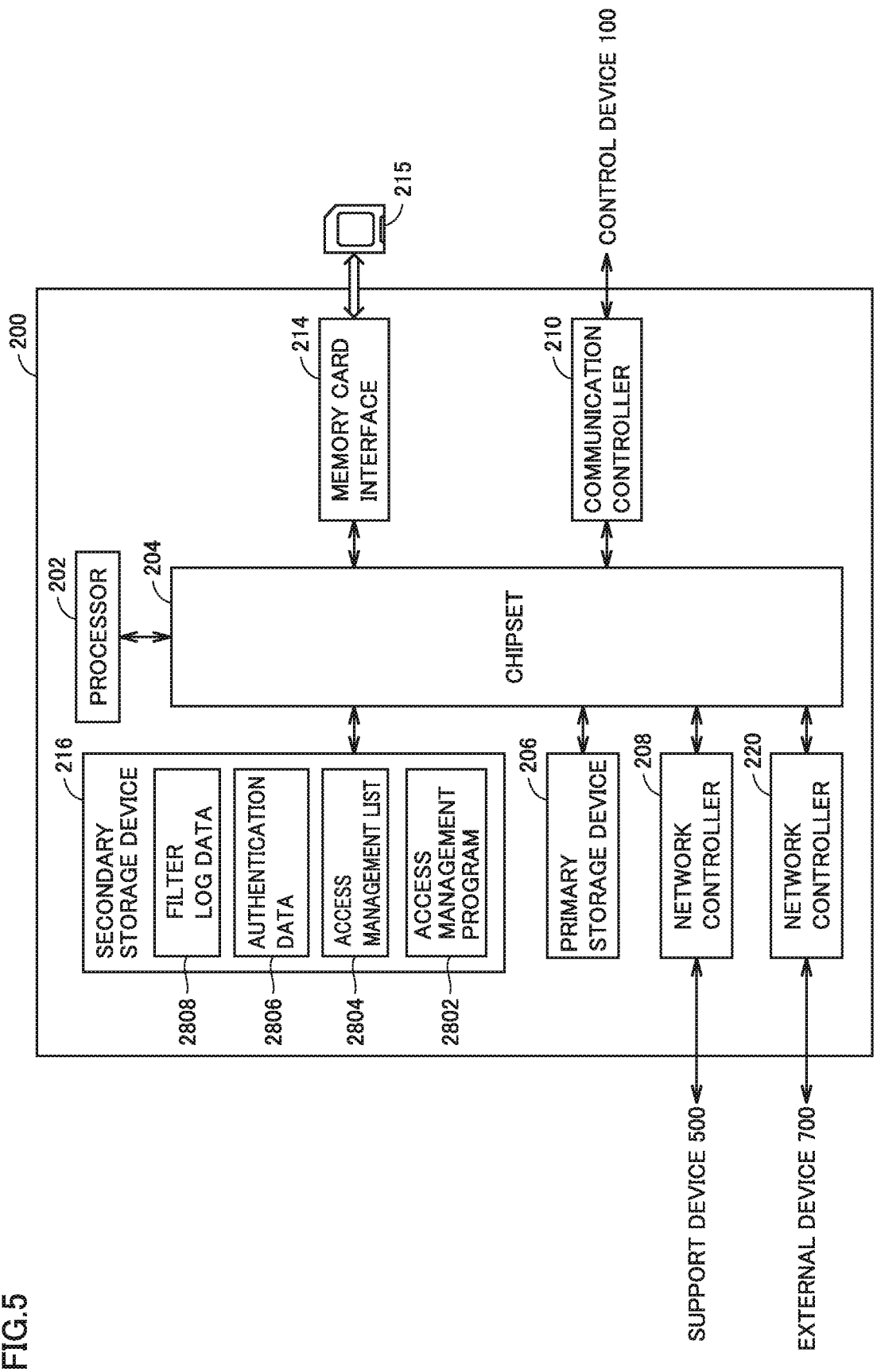
FIG. 5 is a diagram schematically illustrating an example of a hardware configuration of a relay device according to the present embodiment.

FIG. 5 is a diagram schematically illustrating an example of a hardware configuration of relay device 200 according to the present embodiment. As illustrated in FIG. 5, relay device 200 includes, as main components, a processor 202 such as a CPU or a GPU, a chipset 204, a primary storage device 206, a secondary storage device 216, a communication controller 210, a memory card interface 214, and network controllers 208, 220.

Processor 202 reads various programs stored in secondary storage device 216, loads the programs into primary storage device 206, and executes the programs to enable various functions.

Chipset 204 serves as an interface for exchanging data between processor 202 and each component to enable the entire function of relay device 200.

Secondary storage device 216 stores not only a system program that provides basic functions but also various programs that run on a runtime environment provided by the system program. For example, secondary storage device 216 stores an access management program 2802 for performing the access management process including the reception step, the authentication step, the access management step, and the like illustrated in FIG. 1.

Secondary storage device 216 further stores an access management list 2804 that is referred to in the access management step, authentication data 2806 that is referred to in the authentication step, and a filter log 2808. Access management list 2804 will be described with reference to FIGS. 6 and 7. Authentication data 2806 is data used in authentication of the validity of the request source, and contains, as described above, an ID and a password used in password authentication, physical features of the user used in biometric authentication, an electronic certificate used in certificate authentication, key data used in key authentication, or the like. Filter log 2808 is a log of access from external device 700 to control device 100, and contains specific information such as an access history indicating success or failure in access from external device 700 to control device 100. This allows relay device 200 to keep a log of access from external device 700 to control device 100, thereby allowing relay device 200 to easily manage access from external device 700 to control device 100.

Communication controller 210 is responsible for exchanging data with control device 100. As communication controller 210, for example, a communication chip compatible with PCI Express, Ethernet, or the like may be used as with communication controller 110 of control device 100.

Memory card interface 214 is configured to receive a memory card 215 in a detachable manner and is capable of writing data such as a user program or various settings to memory card 215 or reading data such as a user program or various settings from memory card 215.

Each of network controllers 208, 220 is responsible for exchanging data with any device over the network. Each of network controllers 208, 220 may use a general-purpose network protocol such as Ethernet (registered trademark). In the present embodiment, for example, support device 500 and external device 700 are connected to relay device 200 over the network.

FIG. 5 illustrates a configuration example where processor 202 executes a program to provide necessary functions, but some or all of the functions thus provided may be implemented by a dedicated hardware circuit (for example, an ASIC or an FPGA). Alternatively, a core part of relay device 200 may be implemented by hardware having a general-purpose architecture (for example, an industrial personal computer based on a general-purpose personal computer). Further, a plurality of OSs having different uses may be executed in parallel using a virtualization technology, and a necessary application may be executed on each OS.

F. Port Management List Included in Access Management List

FIG. 6 is a table showing a port management list included in access management list 2804 according to the present embodiment. As shown in FIG. 6, access management list 2804 includes a list in which at least one port $\alpha$ ($\alpha$=1 to 3) included in network controller 220 serving as an access path from external device 700 to control device 100 is allocated to a plurality of types of management modes X (X=1 to 3) used for managing a phase (state) of control device 100.

For a port 1, for example, a network protocol such as object linking and embedding for process control unified architecture (OPCUA) is used. For a port 2, for example, a network protocol such as Ethernet is used. For a port 3, for example, a device manufacturer-specific network protocol such as FINS is used.

A management mode 1 is a mode indicating a development phase of a system including control device 100. In the development phase of the system, communications through all ports 1 to 3 are used, so that it is necessary to permit communications through all ports 1 to 3 in management mode 1.

A management mode 2 is a mode indicating an operation phase of the system including control device 100. In the operation phase of the system, communications through only port 1 are used, so that it is necessary to establish communications only through port 1 in management mode 2.

A management mode 3 is a mode indicating a maintenance phase of the system including control device 100. In the maintenance phase of the system, communications through port 1 and port 2 are used, so that it is necessary to establish communications through port 1 and port 2 in management mode 3.

In control system 1, when the restriction level of access from external device 700 to control device 100 is controlled by the access management process, access from external device 700 to control device 100 is permitted through a port enabled in accordance with the type of the current management mode. For example, in the access management step, in management mode 1, access from external device 700 to control device 100 through all ports 1 to 3 is permitted, in management mode 2, access from external device 700 to control device 100 only through port 1 is permitted, while access from external device 700 to control device 100 through ports 2 and 3 is prohibited, and in management mode 3, access from external device 700 to control device 100 through ports 1 and 2 is permitted, while access from external device 700 to control device 100 through port 3 is prohibited.

Since relay device 200 controls the restriction level of access from external device 700 to control device 100 in accordance with the type of the management mode, it is possible to improve security while taking the operation aspect into consideration.

G. IP Address Management List Included in Access Management List

FIG. 7 is a table showing an IP address management list included in access management list 2804 according to the present embodiment. As shown in FIG. 7, the IP address management list includes a so-called blacklist. The blacklist explicitly specifies a specific IP address from which access is prohibited. Note that access management list 2804 may include, rather than such a blacklist, a whitelist that explicitly specifies a specific IP address from which access is permitted.

In control system 1, when the restriction level of access from external device 700 to control device 100 is controlled by the access management process, access from external device 700 to control device 100 is permitted through a port enabled in accordance with the type of the current management mode based on the port management list, while access from an IP address specified in the IP address management list is prohibited.

As described above, it is possible to improve security with the IP address management list used for controlling the restriction level of access from external device 700 to control device 100.

H. Example of Hardware Configuration of Support Device

Figure 8:
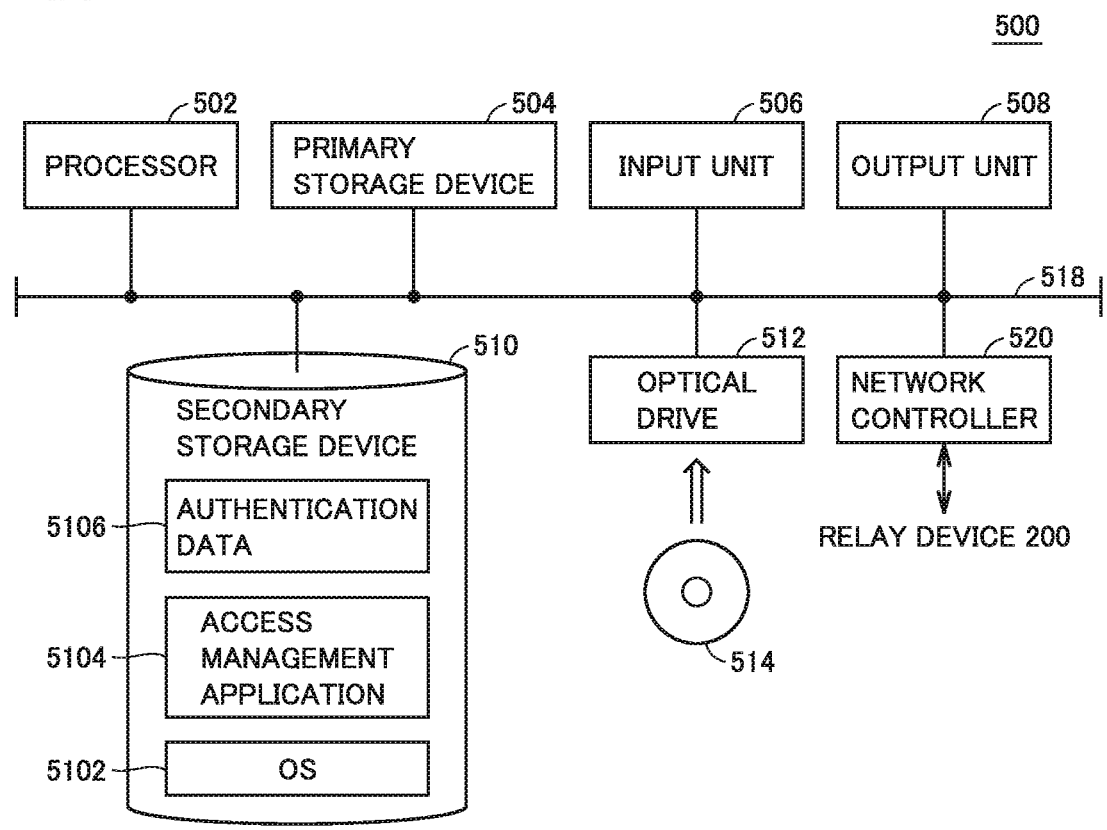
FIG. 8 is a diagram schematically illustrating an example of a hardware configuration of a support device according to the present embodiment.

FIG. 8 is a diagram schematically illustrating an example of a hardware configuration of support device 500 according to the present embodiment. As an example, support device 500 is implemented by hardware having a general-purpose architecture (for example, a general-purpose personal computer). As illustrated in FIG. 8, support device 500 includes a processor 502 such as a CPU or a GPU, a primary storage device 504, an input unit 506, an output unit 508, a secondary storage device 510, an optical drive 512, and a network controller 520. Such components are connected over a processor bus 518.

Processor 502 reads a program stored in secondary storage device 510, loads the program into primary storage device 504, and executes the program to enable various functions.

Secondary storage device 510 stores not only an OS 5102 for implementing basic functions but also an access management application 5104 as a program for the access management process performed by relay device 200 and authentication data 5106. In access management application 5104, for example, a process of starting (kicking off) the access management process when support device 500 functions as request source 500a illustrated in FIG. 1 is defined, and when access management application 5104 is executed, the authentication request is transmitted from support device 500 to relay device 200. Authentication data 5106 is data used for authentication of the validity of the user of support device 500 serving as the request source, and contains, as described above, an ID and a password used in password authentication, physical features of the user used in biometric authentication, an electronic certificate used in certificate authentication, key data used in key authentication, or the like.

Input unit 506 includes a keyboard, a mouse, or the like, and receives a user operation. Output unit 508 includes a display, various indicators, a printer, or the like, and outputs a processing result and the like received from processor 502.

Support device 500 includes optical drive 512 so as to allow a program stored in a computer-readable recording medium 514 (for example, an optical recording medium such as a digital versatile disc (DVD)) that stores instructions in a non-transitory manner to be read and installed in secondary storage device 510 or the like.

Various programs executed on support device 500 may be installed via computer-readable recording medium 514, or may be downloaded from a server device or the like on a network and then installed. Functions provided by support device 500 according to the present embodiment may be implemented via some of the modules provided by the OS.

Network controller 520 is responsible for exchanging data with any device over the network. Network controller 520 may use a general-purpose network protocol such as Ethernet (registered trademark). In the present embodiment, for example, relay device 200 is connected to support device 500 over the network.

FIG. 8 illustrates a configuration example where processor 502 executes a program to provide functions necessary for support device 500, but some or all of the functions thus provided may be implemented by a dedicated hardware circuit (for example, an ASIC or an FPGA).

I. Example of Access Management Process in Control System

Figure 9:
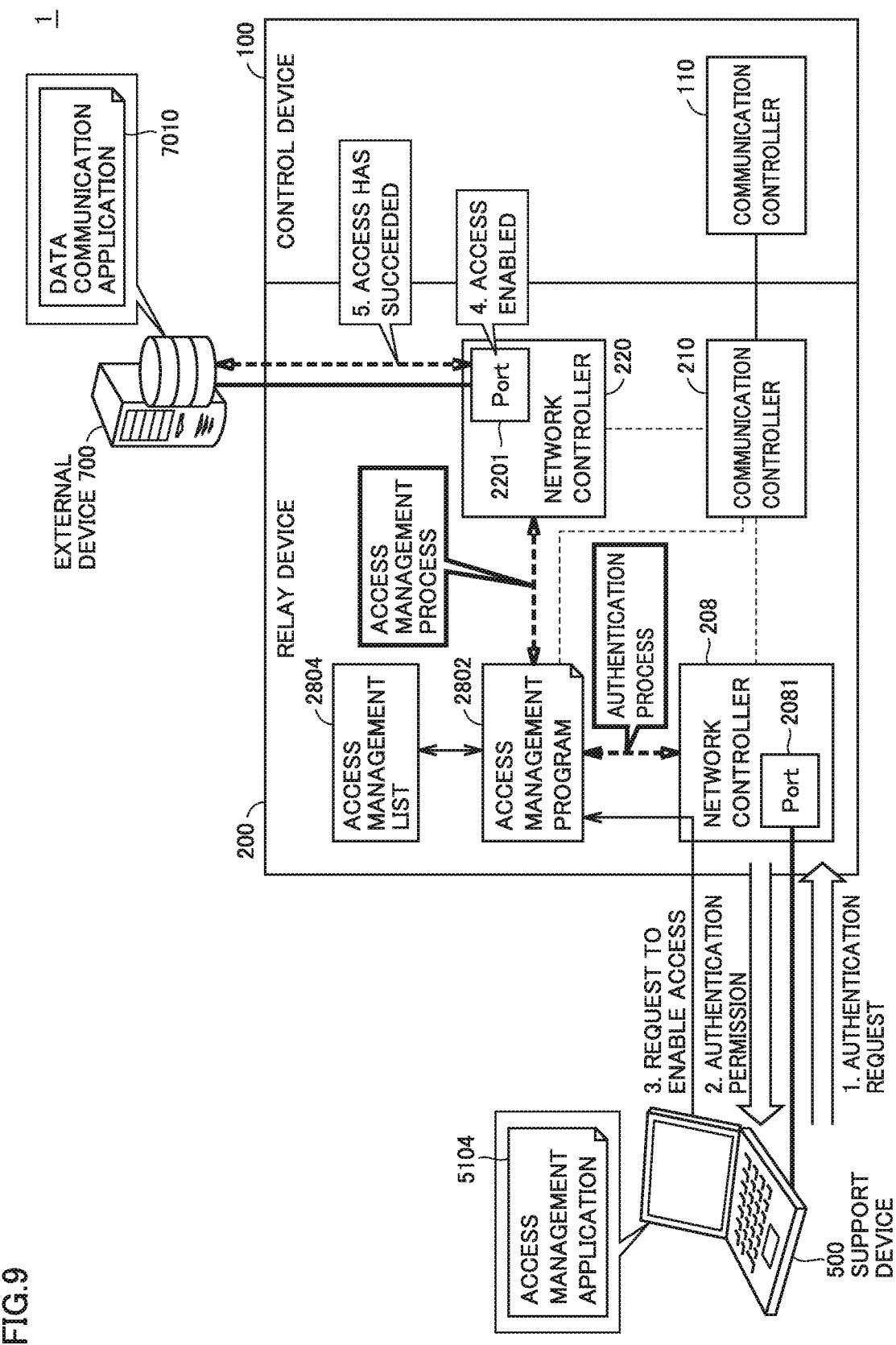
FIG. 9 is a diagram schematically illustrating an example of an access management process in the control system according to the present embodiment.

FIG. 9 is a diagram schematically illustrating an example of the access management process in control system 1 according to the present embodiment. Note that, as described above, FIGS. 9 to 11 illustrate an example of the access management process performed in control system 1 according to pattern 1 shown in FIG. 3.

As illustrated in FIG. 9, when support device 500 serving as the request source executes access management application 5104, the authentication request is issued from support device 500 to relay device 200. At this time, authentication data 5106 input by the user is transmitted from support device 500 to relay device 200.

Upon receipt of the authentication request from support device 500 through a communication port 2081 included in network controller 208, relay device 200 compares authentication data 5106 from support device 500 with authentication data 2806 held by relay device 200 for authentication of the validity of the user of support device 500 serving as the request source. The authentication of the validity of the user of support device 500 is concealed by VPN authentication, so that security is ensured. Such an authentication process is performed in accordance with access management program 2802.

Having authenticated the validity of the user of support device 500, relay device 200 notifies support device 500 of an authentication permission. This establishes communications between support device 500 and relay device 200 with security ensured by VPN authentication.

Support device 500 requests relay device 200 to enable access from external device 700 to control device 100 in accordance with access management application 5104.

On the other hand, relay device 200 enables access from external device 700 to relay device 200 through a communication port 2201 included in network controller 220 by the access management process in accordance with access management program 2802. At this time, relay device 200 controls, in accordance with access management program 2802, network controller 220 based on access management list 2804 so as to permit only access through a communication port enabled in accordance with the management mode requested by support device 500 and to prohibit access through the other communication ports.

Thereafter, for the communication port to which access is permitted, access from external device 700 is permitted, and external device 700 can acquire various data from control device 100 via relay device 200.

Since the restriction level of access from the external device 700 to control device 100 is controlled by relay device 200 that relays access from external device 700 to control device 100 when the validity of the user of support device 500 serving as the request source is authenticated by relay device 200, it is possible to improve security without changing external device 700 that runs on a legacy application.

J. Sequence of Access Management Process in Control System

Figure 10:
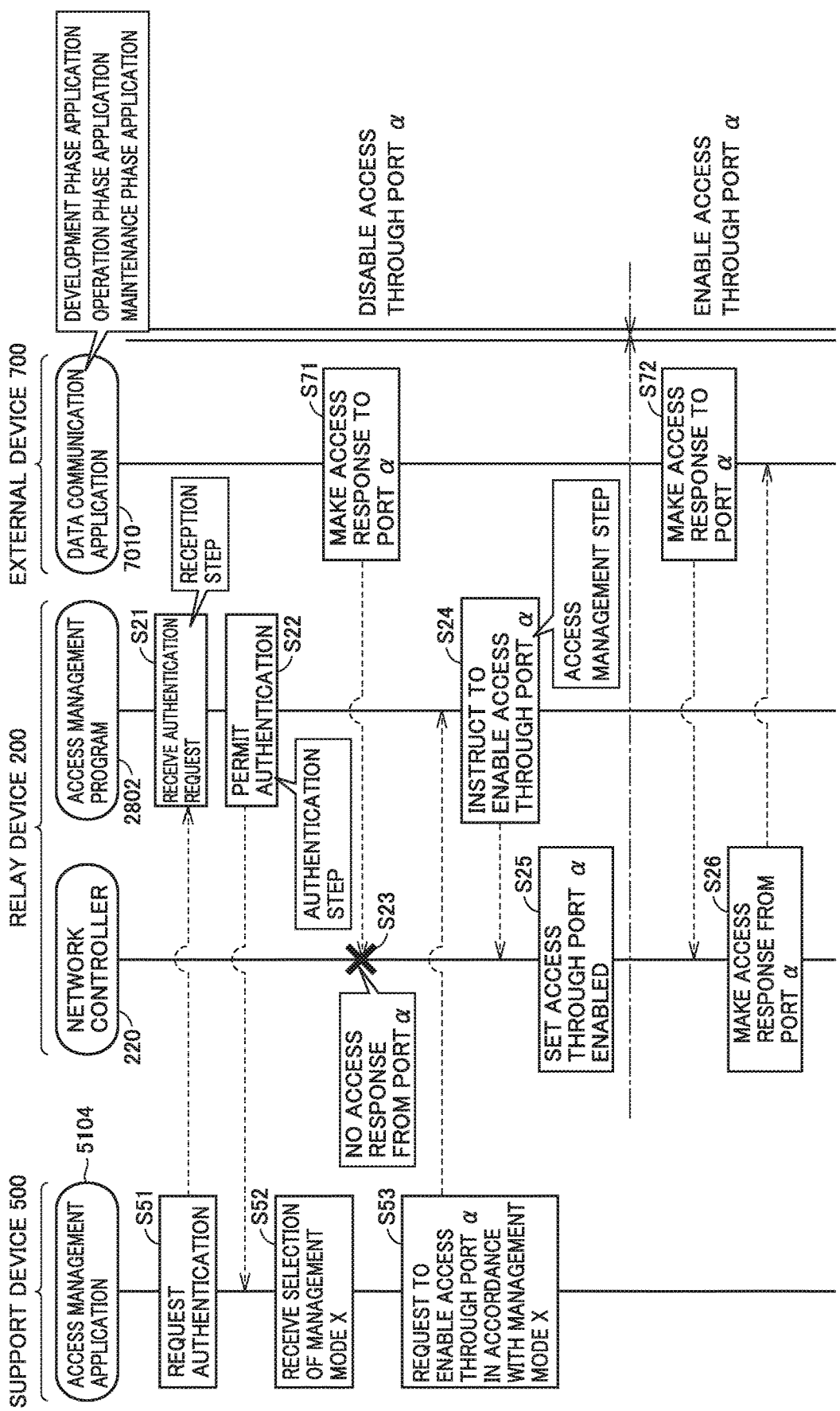
FIG. 10 is a sequence diagram illustrating the example of the access management process in the control system according to the present embodiment.

FIG. 10 is a sequence diagram illustrating an example of an access management method in control system 1 according to the present embodiment. Note that FIG. 10 illustrates a sequence in which, in support device 500, a corresponding process proceeds when processor 502 executes access management application S104, in relay device 200, a corresponding process proceeds when processor 202 executes access management program 2802, and in external device 700, a corresponding process proceeds when a processor (not illustrated) included in external device 700 executes a data communication application 7010. In particular, processor 202 executes access management program 2802 to enable the function of reception unit 230*a*, the function of authentication unit 240*a*, and the function of access management unit 250*a* illustrated in FIG. 1.

As illustrated in FIG. 10, first, support device 500 serving as the request source issues the authentication request to relay device 200 (S51). Upon receipt of the authentication request from support device 500 (S21), relay device 200 authenticates the validity of the user of support device 500. Having authenticated the validity of the user of support device 500, relay device 200 notifies support device 500 of the authentication permission (S22). This establishes communications between support device 500 and relay device 200 with security ensured by VPN authentication.

When the communications between support device 500 and relay device 200 have been established with security ensured, support device 500 receives the selection of management mode X (X=1 to 3) from the user or the like (S52). Support device 500 requests relay device 200 to enable access through port α (α=1 to 3) in accordance with management mode X thus selected (S53).

On the other hand, relay device 200 instructs, based on access management list 2804, network controller 220 to enable access through port α in accordance with selected management mode X (S24). Accordingly, network controller 220 of relay device 200 sets access through port α enabled in accordance with selected management mode X (S25).

Thereafter, for the communication port to which access is permitted, access from external device 700 is permitted, and external device 700 can acquire various data from control device 100 via relay device 200. For example, when external device 700 makes an access response to port α before access through port α is enabled (S71), no response is made from network controller 220 (S23), but when external device 700 makes an access response to port α after access through port α is enabled (S72), a response is made from network controller 220 (S26).

Since the restriction level of access from external device 700 to control device 100 is controlled by access management program 2802 for managing access from external device 700 to control device 100 when the validity of the user of support device 500 serving as the request source is authenticated by access management program 2802, it is possible to improve security without changing external device 700 that runs on a legacy application.

K. Case Where Incident Occurs in Access Management Process in Control System

Figure 11:
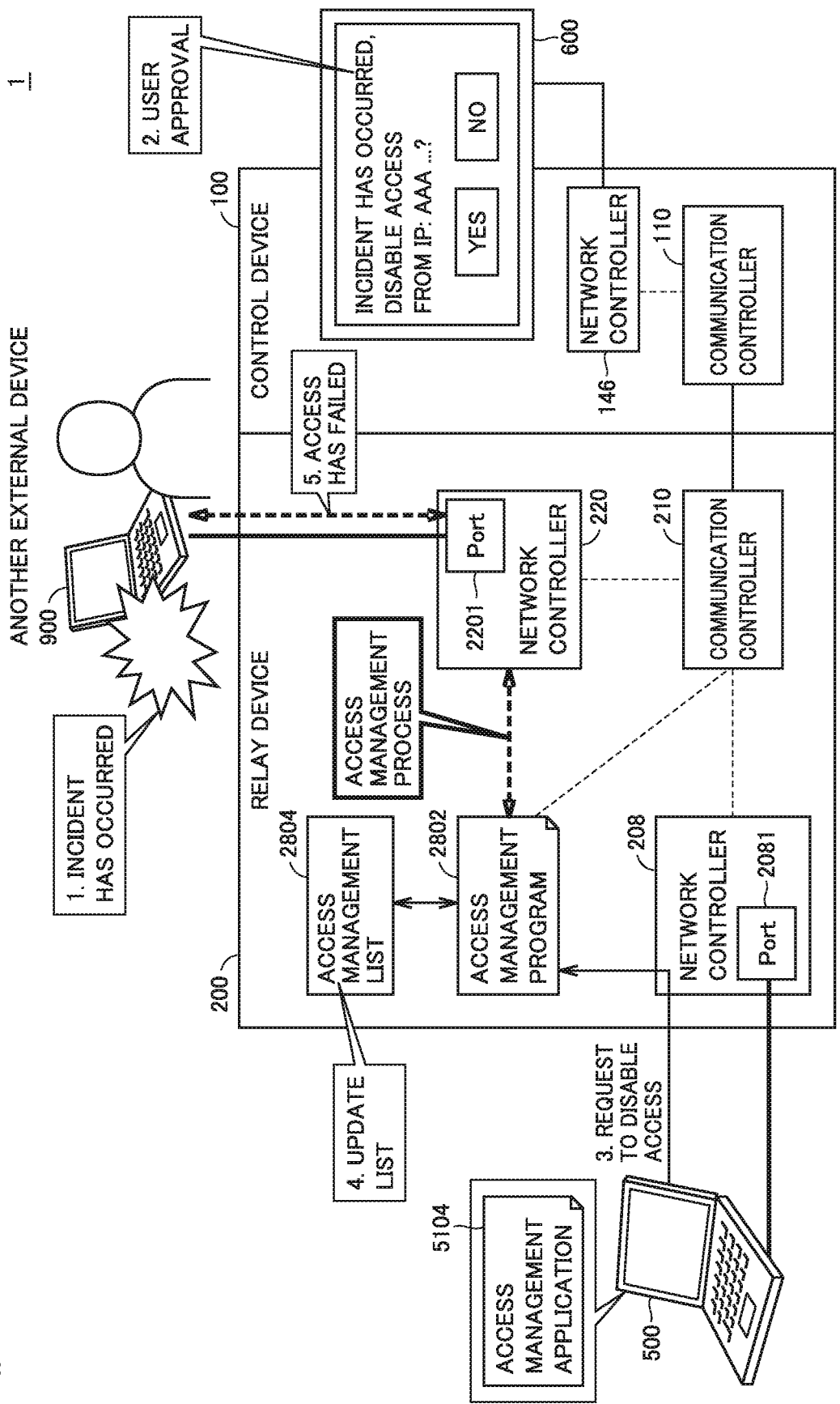
FIG. 11 is a diagram schematically illustrating an example of a case where an incident occurs in the access management process in the control system according to the present embodiment.

FIG. 11 is a schematic diagram illustrating an example of a case where an incident occurs in the access management process in control system 1 according to the present embodiment.

As illustrated in FIG. 11, it is assumed that an incident occurs with access from another external device 900 to control device 100 permitted. At this time, it is assumed that the IP address of another external device 900 is not included in the blacklist in access management list 2804 shown in FIG. 7. When the incident occurs, an image indicating that the incident has occurred is displayed on HMI 600. Further, on HMI 600, the IP address of another external device 900 that has caused the incident and an image for prompting for selection of whether to disable access from external device 900 are displayed.

When the user approves disabling access from external device 900 (for example, selects YES on the screen), support device 500 requests relay device 200 to disable access from another external device 900 to control device 100.

Accordingly, relay device 200 updates the blacklist in access management list 2804 to add, to the blacklist, the IP address of another external device 900 that has caused the incident. Thereafter, access from another external device 900 to control device 100 is prohibited.

As described above, in control system 1, it is possible to improve security with access management list 2804 used for controlling the restriction level of access from external device 700 to control device 100. Furthermore, since access management list 2804 is updated when an incident occurs in access from another external device 900 to control device 100, it is possible to improve security with access management list 2804 with consideration given to the occurrence of the incident.

L. Access Management Process in Control System According to Another Embodiment FIG. 12 is a diagram schematically illustrating an example of an access management process in a control system 1000 according to another embodiment.

Note that, as described above, FIG. 12 illustrate an example of the access management process performed in control system 1000 according to pattern 2 shown in FIG. 3.

Figure 12:
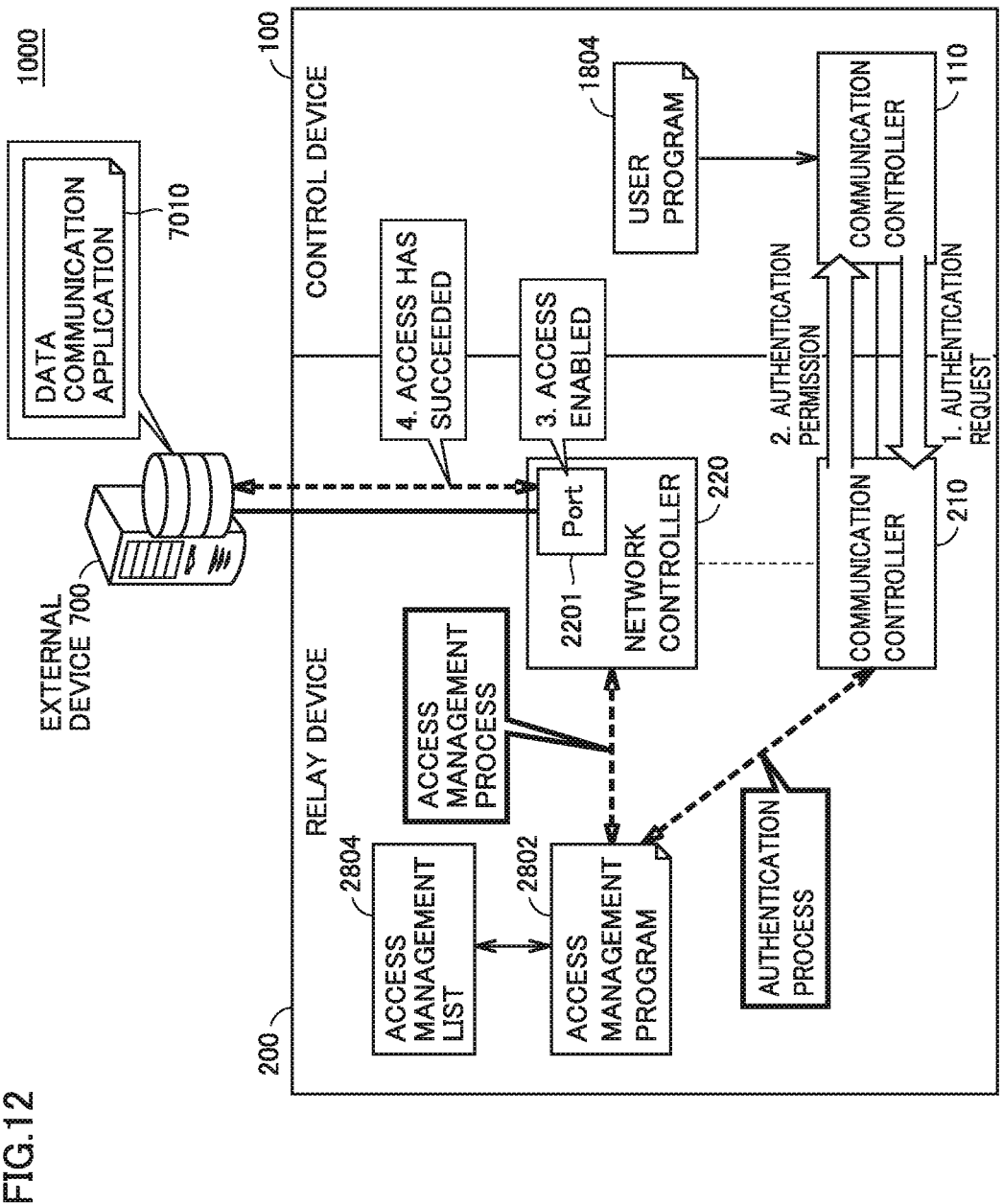
FIG. 12 is a diagram schematically illustrating an example of an access management process in a control system according to another embodiment.

Control system 1000 according to pattern 2 illustrated in FIG. 12 is different from control system 1 according to pattern 1 illustrated in FIG. 9 in that control device 100 serves as the request source. Specifically, first, in control device 100 serving as the request source, communication controller 110 issues the authentication request to communication controller 210 of relay device 200 in accordance with an instruction from user program 1804. At this time, authentication data is transmitted from control device 100 to relay device 200.

Upon receipt of the authentication request from control device 100 via communication controller 210, relay device 200 authenticates the validity of control device 100 serving as the request source by, for example, comparing the authentication data from control device 100 with authentication data 2806 held by relay device 200. The authentication of the validity of control device 100 is concealed by the VPN authentication, so that security is ensured. Such an authentication process is performed in accordance with access management program 2802.

Having authenticated the validity of control device 100, relay device 200 notifies control device 100 of the authentication permission. This establishes communications between control device 100 and relay device 200 with security ensured by VPN authentication.

Relay device 200 enables access from external device 700 to relay device 200 through communication port 2201 included in network controller 220 by the access management process in accordance with access management program 2802. At this time, relay device 200 controls, in accordance with access management program 2802, network controller 220 based on access management list 2804 so as to permit only access through a communication port enabled in accordance with the management mode requested by control device 100 and to prohibit access through the other communication ports.

Thereafter, for the communication port to which access is permitted, access from external device 700 is permitted, and external device 700 can acquire various data from control device 100 via relay device 200.

M. Appendix

As described above, the present embodiment includes the following disclosure.

Configuration 1

A control system (1a, 1) configured to control a control object, the control system (1a, 1) including:
- a control unit (100a, 100) configured to control the control object and communicate with an external device (700a, 700); and
- a relay unit (200a, 200) configured to relay access from the external device to the control unit, wherein the relay unit includes:
- a reception unit (230a, 202) configured to receive an authentication request from a request source;
- an authentication unit (240a, 202) configured to authenticate validity of the request source upon receipt of the authentication request by the reception unit; and
- an access management unit (250a, 202) configured to control a restriction level of access from the external device to the control unit when the validity of the request source is authenticated by the authentication unit.

Configuration 2

The control system according to configuration 1, wherein the authentication unit authenticates the validity of the request source based on predetermined authentication data.

Configuration 3

The control system according to configuration 2, wherein the authentication unit authenticates the validity of the request source with communications from the request source concealed.

Configuration 4

The control system according to any one of configurations 1 to 3, wherein
- the control unit communicates with the external device in accordance with a type of a management mode, and
- the access management unit controls the restriction level of access from the external device in accordance with the type of the management mode.

Configuration 5

The control system according to any one of configurations 1 to 4, wherein the relay unit keeps a log (2808) of access from the external device to the control unit.

Configuration 6

The control system according to any one of configurations 1 to 5, wherein the access management unit controls, based on a list (2804) for controlling the restriction level of access from the external device to the control unit, the restriction level of access from the external device to the control unit when the validity of the request source is authenticated by the authentication unit.

Configuration 7

The control system according to configuration 6, wherein the list is updated when an incident occurs in access from the external device to the control unit.

Configuration 8

A relay device (200a, 200) configured to relay access from an external device (700a, 700) to a control device (100a, 100) configured to control a control object, the relay device (200a, 200) including:
 a reception unit (230a, 202) configured to receive an authentication request from a request source;
 an authentication unit (240a, 202) configured to authenticate validity of the request source upon receipt of the authentication request by the reception unit; and
 an access management unit (250a, 202) configured to control a restriction level of access from the external device to the control device when the validity of the request source is authenticated by the authentication unit.

Configuration 9

An access management program (2802) configured to manage access from an external device (700a, 700) to a control device (100a, 100) configured to control a control object, the access management program (2802) causing a computer (202) to execute:
 a reception step of receiving an authentication request from a request source (S21);
 an authentication step of authenticating validity of the request source upon receipt of the authentication request in the reception step (S22); and
 an access management step of controlling a restriction level of access from the external device to the control device when the validity of the request source is authenticated in the authentication step (S24).

N. Advantages

Control system 1 according to the present embodiment can improve security without changing external device 700 that runs on a legacy application.

It should be understood that the embodiments disclosed herein are illustrative in all respects and not restrictive. The scope of the present invention is defined by the claims rather than the above description, and the present invention is intended to include the claims, equivalents of the claims, and all modifications within the scope.

REFERENCE SIGNS LIST 1, 1a, 1000: control system, 11, 12: network, 100: control device, 100a: control unit, 102, 202, 502: processor, 104, 204: chipset, 106, 206, 504: primary storage device, 108, 216, 510: secondary storage device, 110, 110a, 210, 210a: communication controller, 114, 214: memory card interface, 115, 215: memory card, 122: internal bus controller, 144, 146, 208, 220, 220a, 520: network controller, 200: relay device, 200a: relay unit, 230a: reception unit, 240a: authentication unit, 250a: access management unit, 400: function unit, 450: power supply unit, 500: support device, 500a: request source, 506: input unit, 508: output unit, 512: optical drive, 514: recording medium, 518: processor bus, 700, 700a: external device, 900: another external device, 800: field device, 1802: system program, 1804: user program, 2081, 2201: communication port, 2802: access management program, 2804: access management list, 2806, 5106:
 authentication data, 2808: filter log, 5104: access management application, 7010: data communication application

The invention claimed is:

1. A control system configured to control a control object, the control system comprising:
 a control unit configured to control the control object and communicate with an external device through a plurality of ports; and
 a relay unit configured to relay access from the external device to the control unit,
 wherein the relay unit comprises:
  a reception unit configured to receive an authentication request from a request source;
  an authentication unit configured to authenticate validity of the request source upon receipt of the authentication request by the reception unit; and
  an access management unit configured to control a restriction level of access from the external device to the control unit based on a port management list that defines a communication permitted state of each of the plurality of ports for each of a plurality of management modes of the control unit, when the validity of the request source is authenticated by the authentication unit, and
 wherein the control unit is configured to communicate with the external device through at least one port permitted by the port management list of the plurality of ports according to a type of a management mode;
 wherein the plurality of management modes include a development phase, an operation phase, and a maintenance phase;
 wherein a number of ports permitted in the operation phase is smaller than a number of ports permitted in each of the development phase and the maintenance phase; and
 wherein the access management unit is configured to control the restriction level of access from the external device to the control unit for the at least one port permitted by the port management list according to the type of the management mode.

2. The control system according to claim 1, wherein the authentication unit authenticates the validity of the request source based on predetermined authentication data.

3. The control system according to claim 2, wherein the authentication unit authenticates the validity of the request source with communications from the request source concealed.

4. The control system according to claim 1, wherein the relay unit keeps a log of access from the external device to the control unit.

5. A relay device configured to relay access from an external device through a plurality of ports to a control device, the control device being configured to control a control object, the relay device comprising:
 a reception unit configured to receive an authentication request from a request source;

an authentication unit configured to authenticate validity of the request source upon receipt of the authentication request by the reception unit; and an access management unit configured to control a restriction level of access from the external device to the control device based on a port management list that defines a communication permitted state of each of the plurality of ports for each of a plurality of management modes of the control device, when the validity of the request source is authenticated by the authentication unit, wherein the control device is configured to communicate with the external device through at least one port permitted by the port management list of the plurality of ports according to a type of a management mode;

wherein the plurality of management modes include a development phase, an operation phase, and a maintenance phase;

wherein a number of ports permitted in the operation phase is smaller than a number of ports permitted in each of the development phase and the maintenance phase; and wherein the access management unit is configured to control the restriction level of the access from the external device to the control device for the at least one port permitted by the port management list according to the type of the management mode.

6. The relay device according to claim 5, wherein the authentication unit authenticates the validity of the request source based on predetermined authentication data.

7. The relay device according to claim 6, wherein the authentication unit authenticates the validity of the request source with communications from the request source concealed.

8. The relay device according to claim 5, wherein the relay device keeps a log of access from the external device to the control device.

9. An access management method for managing access from an external device through a plurality of ports to a control device, the control device being configured to control a control object, the access management method comprising:

receiving an authentication request from a request source;

authenticating validity of the request source upon receipt of the authentication request; and controlling a restriction level of access from the external device to the control device based on a port management list that defines a communication permitted state of each of the plurality of ports for each of a plurality of management modes of the control device, when the validity of the request source is authenticated, wherein the control device communicates with the external device through at least one port permitted by the port management list of the plurality of ports according to a type of a management mode, wherein the plurality of management modes include a development phase, an operation phase, and a maintenance phase;

wherein a number of ports permitted in the operation phase is smaller than a number of ports permitted in each of the development phase and the maintenance phase; and wherein the restriction level of the access from the external device to the control device is controlled for the at least one port permitted by the port management list according to the type of the management mode.

10. The access management method according to claim 9, wherein the validity of the request source is authenticated based on predetermined authentication data.

11. The access management method according to claim 10, wherein the validity of the request source is authenticated with communications from the request source concealed.

* * * * *